July 10, 1962  C. W. CAMP  3,043,226
FLOW CONTROL MEANS FOR A PUMPING STATION
Filed Jan. 11, 1961  4 Sheets-Sheet 1

CLEMENT W. CAMP
*INVENTOR.*

BY Daniel H. Bobst
Atty.

July 10, 1962

C. W. CAMP 3,043,226

FLOW CONTROL MEANS FOR A PUMPING STATION

Filed Jan. 11, 1961

CLEMENT W. CAMP
INVENTOR.

BY *Daniel H. Bobis*
*Atty*

July 10, 1962 C. W. CAMP 3,043,226
FLOW CONTROL MEANS FOR A PUMPING STATION
Filed Jan. 11, 1961 4 Sheets-Sheet 3

CLEMENT W. CAMP
INVENTOR.
BY Daniel A. Bolts
atty.

July 10, 1962 C. W. CAMP 3,043,226
FLOW CONTROL MEANS FOR A PUMPING STATION
Filed Jan. 11, 1961 4 Sheets-Sheet 4

CLEMENT W. CAMP
INVENTOR.

BY Daniel H. Bobis
Atty.

United States Patent Office 3,043,226
Patented July 10, 1962

3,043,226
FLOW CONTROL MEANS FOR A PUMPING STATION
Clement W. Camp, West Orange, N.J., assignor to Worthington Corporation, Harrison, N.J., a corporation of Delaware
Filed Jan. 11, 1961, Ser. No. 82,063
10 Claims. (Cl. 103—26)

This invention relates generally to fluid pumping units or pumping stations utilized in installations were the quantity of fluid to be pumped varies widely from time to time, such as in sewage systems or combined sewage and storm sewer systems, etc.; and more particularly to a combined variable flow control means for the pumps responsive to the rise and fall of the fluid level in the suction reservoir at a particular reference level, to control the speed of the pumping units; and upstream controller responsive to changes in reference level at the upstream location and adapted to change the reference level in the suction reservoir in accordance with conditions at the upstream location.

Heretofore, difficulty has been experienced in preventing flooding of the areas adjacent the outlying inlet conduits to the suction reservoir in the above type of pumping station.

Various designs have been proposed to overcome this problem which, together with the present invention, is rather generally based on the same fundamental conception. Thus, they all make provision for lowering the wet well level in the suction reservoir to thereby eliminate the arresting effect that the higher level has on the water or the like flowing to said suction reservoir from the outlying conduits.

To this end United States Patent 2,733,660 assigned to Worthington Corporation the present assignee suggests that the wet well level may be lowered by adjusting the length of chain connected to the float operating the control.

Whereas United States Patent 2,950,683 also assigned to Worthington Corporation teaches lowering the wet well level by providing manually actuated means for repositioning the float in the suction reservoir.

According to the present invention, the wet well level at the suction reservoir is automatically lowered when level conditions at the outlying conduits approach the flood point.

The present invention accomplishes the foregoing objective with the provision of an upstream controller, adapted to sense level conditions in the outlying conduit, and transmits these variations to the station to automatically start one or more pumps to cause a lowering of the level in the suction reservoir to thereby preclude the flooding of areas bounding on the inlet conduits.

Accordingly, it is an object of the present invention to provide an upstream controller which is intimately associated with the pumping station flow control to adjust the reference level in the suction reservoir in accordance with conditions at the upstream location.

It is a further object of the present invention to provide a control adapted to automatically regulate within predetermined limits, the fluid level in the suction reservoir of a pumping station by controlling the number of pumps in operation and their speed so as to equate the rate of discharge of said pump or pumps against the inflow to the suction reservoir.

It is still another object of the present invention to provide a more versatile control for pumping stations.

Other objects and advantages of the invention including the basic design and the nature of the improvements thereon will appear from the following description taken in conjunction with the following drawings showing a pumping station provided with the improved flow control, in which.

Figure 1:
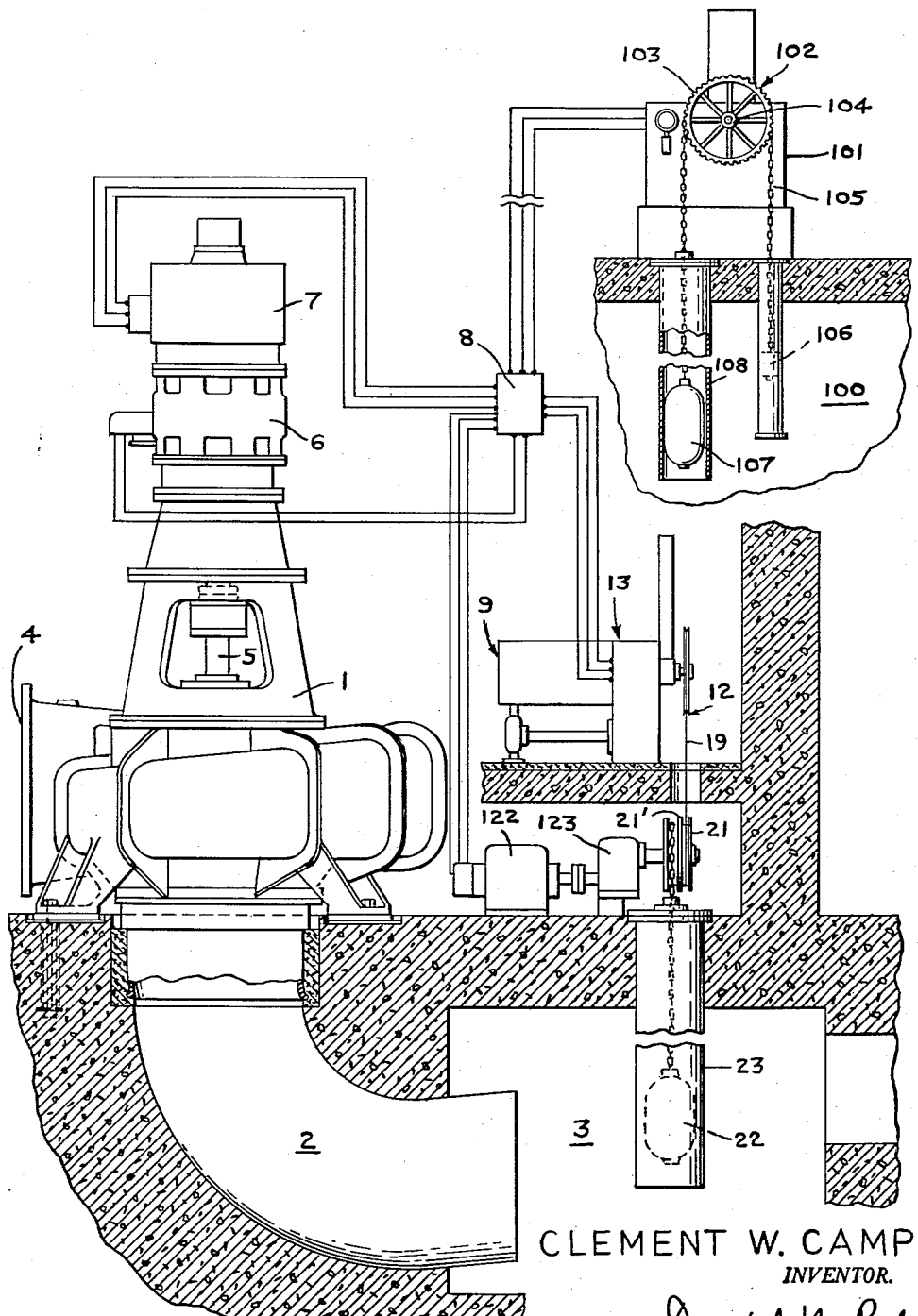
FIGURE 1 is a diagrammatic view of the pumping station showing both the station and upstream controls.

Referring more particularly to the drawings, FIGURE 1 thereof illustrates a pumping station embodying the present invention, wherein the pump 1, which may be of any approved type of centrifugal pump applicable for use in the pumping conditions to be met, has its suction 2 connected to a source of liquid to be pumped (not shown), in the present instance through a reservoir 3. The pump 1 discharges through its discharge outlet 4 to any suitable point of discharge. The driving shaft 5 of the pump 1 is connected to a magnetic drive or speed regulating means 6 which is in turn driven by an electric motor 7.

The pumping station herein illustrated employs an electrical control 8 in connection with the magnetic drive 6 of the character illustrated in United States Letters Patent 2,733,660, to provide adjustable, pre-selected speed of the shafts and consequently of the pump 1. A liquid level operated flow control means 9 (shown in FIGURES 1, 2, 3 and 4 and of the type shown in the above Patent 2,733,660) in association with the electrical control 8 will provide control of the speed operation of pump 1 in substantially stepless speed variations, the steps in speed variation being so small as to be unnoticeable.

The magnetic drive and electrical control hereinabove referred to are well known in the art and purchaseable on the open market. Accordingly, it is to be understood that other applicable variable speed torque transmitters or other applicable electrical controllers than that shown herein and referred to above may be employed without departing from the spirit of the invention.

Figure 2:
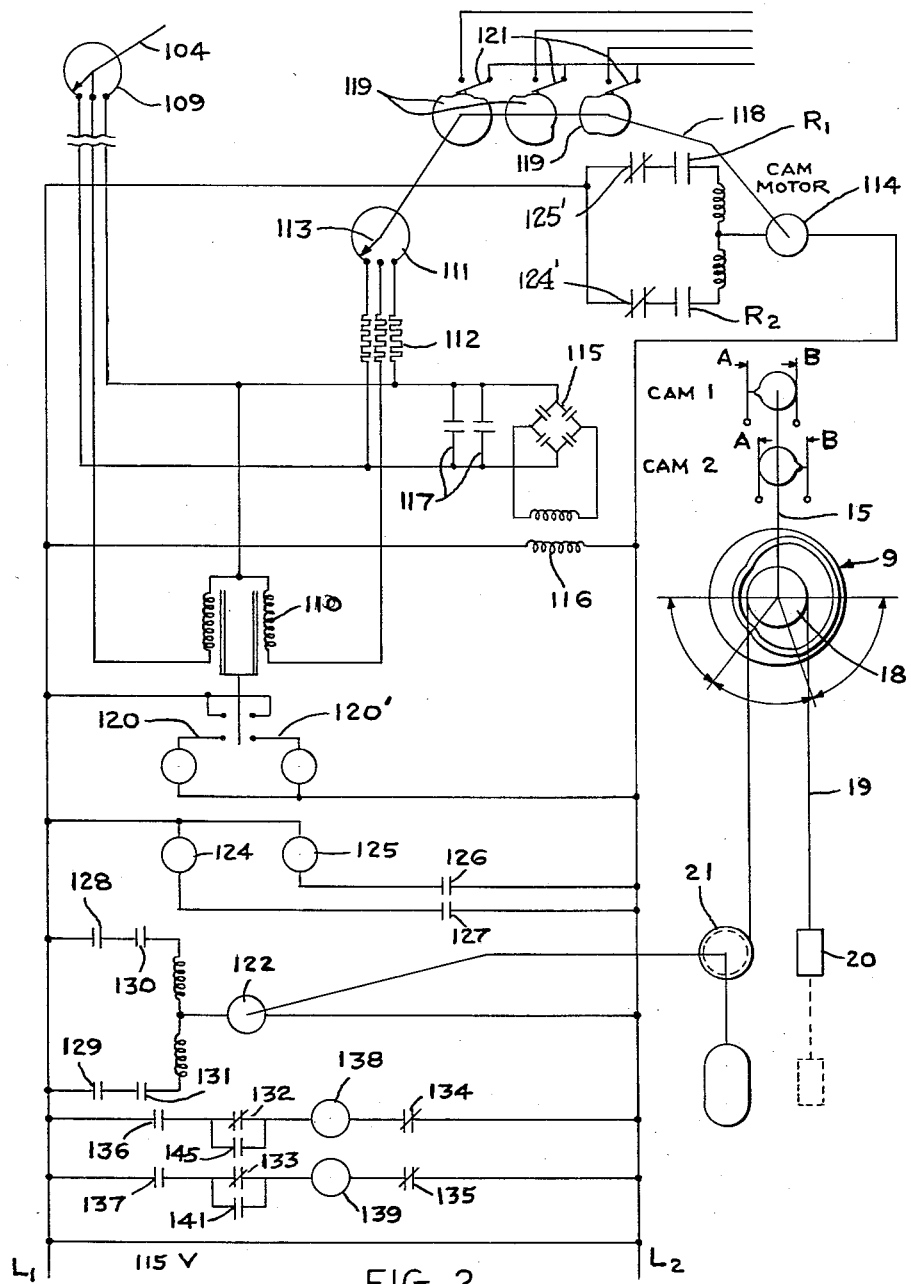
FIGURE 2 is a schematic circuit diagram showing the interaction between the upstream and station controls.
Figure 3:
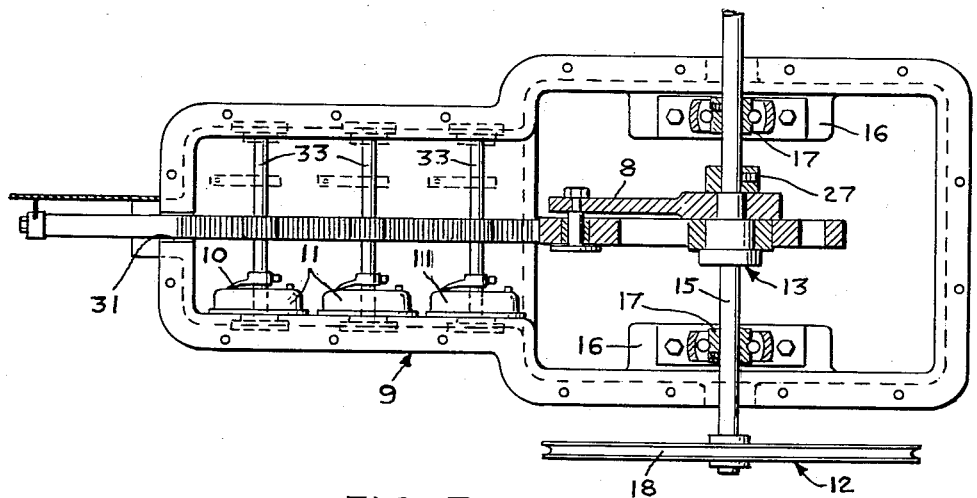
FIGURE 3 is a top view partly in section of the station control.

The fluid level variance operated flow control means 9 shown in FIGURE 3 which operates or moves the arm or wiper 10 (FIGURE 3) of variable resistance means 11 such as a potentiometer rheostat which adjusts the speed of operation of the pump 1 through the magnetic drive 6 as is more fully described in above Patent 2,733,660 and shown in FIGURES 1, 2, 3 and 4 of the drawings.

The flow control means 9 comprises indicator means generally designated 12 for measuring the level in suction reservoir 3, control means 13 connected to the indicator means as hereinafter described, to signal the speed regulating means of magnetic drive 6 through electric controller 8 to vary the output of the pump 1 by varying the power flow from the motor 7 to the shaft 5.

To provide a pumping station wherein the reference level may be lowered to thereby eliminate the arresting effect that the higher level has on the water or the like flowing to the suction reservoir from the outlying conduits 100, means taking the form of a controller 101 is disposed to sense level in the conduits 100 and transmit an increase in level to the electronic control 8 to thereby start pumps which in effect will lower the reference level as will be more fully described hereinafter.

Referring more in detail to the flow control means 9, it is shown in FIGURES 1, 2, 3 and 4 of the drawings and comprises indicator means 12 which includes a shaft 15 supported from suitable pedestals 16 by bearings 17. A pulley or rotary element 18 is keyed on the shaft 15 and includes means for imparting rotation thereto such as a cable 19 as is clearly shown in FIGURE 1 of the drawings. The chain or cable 19 has a counterweight 20 attached to one end thereof and at the other end is mounted about adjustable means shown as winding drum 21. The cable mounted about winding drum 21 is in turn connected to float 22 which is located in a float tube or float well 23. The bottom of or open lower end of the float tube extends into the suction reservoir 3 below the normal level of liquid therein so that variances in the level of liquid in the suction reservoir 3 will move the float 22. Movement of the float under variances of the liquid level in the suction reservoir 3 will through the cable 19 and winding drum 21 rotate the pulley 18 and shaft 15.

To convey variances of the fluid level in the suction reservoir to the speed control means 6, flow control means 9 includes control means generally designated 13 operatively connected to the shaft 15 of the indicator means 12.

Figure 4:
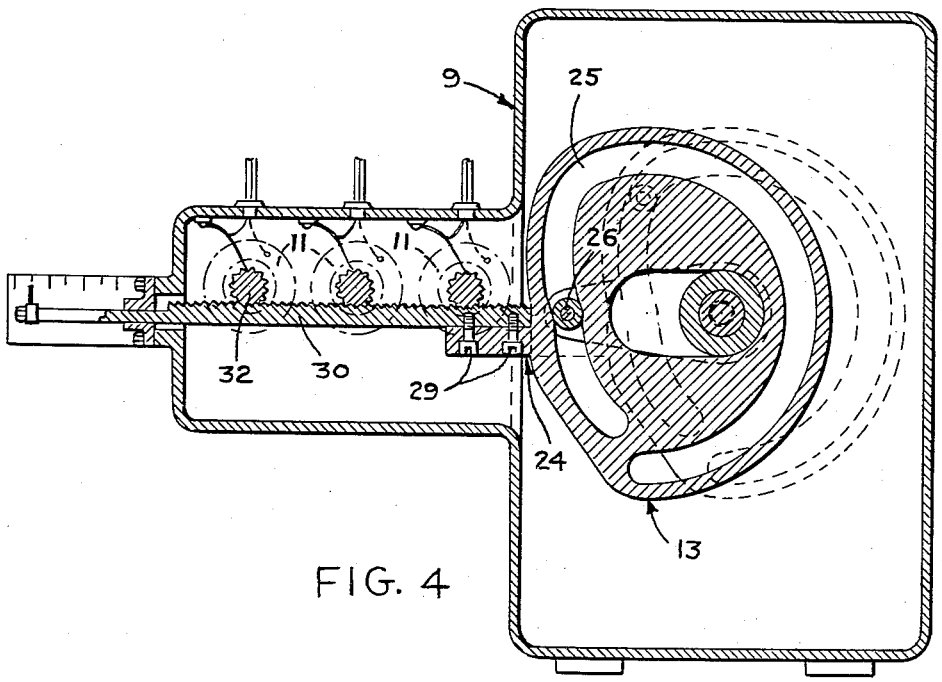
FIGURE 4 is a longitudinal view partly in section of the control shown in FIGURE 3.
Figure 6:
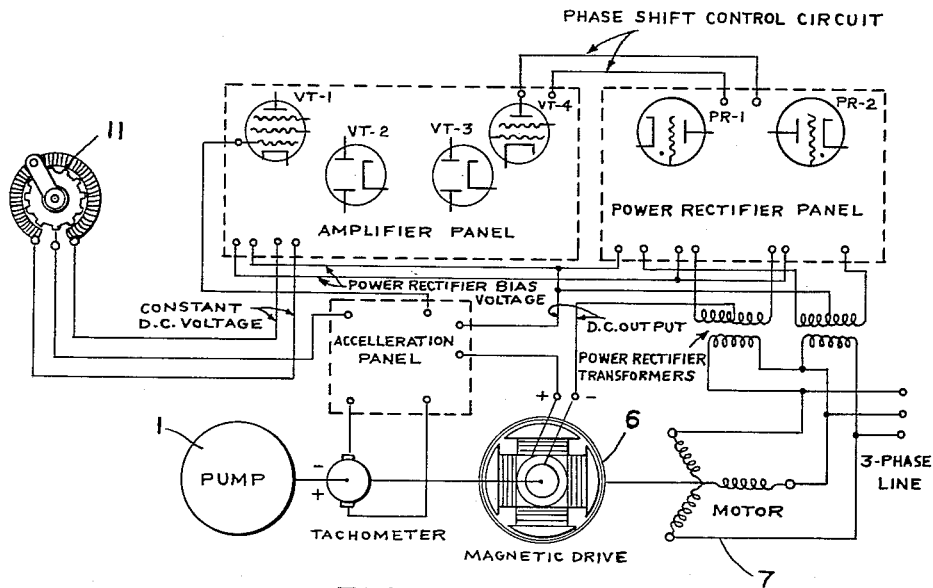
FIGURE 6 is a diagrammatic representation of one type of electronic controller for controlling operation of the magnetic drive.

The action of the indicator means 12 is transmitted to the control means 13 through a cam and rack arrangement generally designated 24 which is mounted about the shaft 15 of the indicator means 12. The cam, as is more fully described in Patent 2,733,660, has a cam groove or track 25 formed therein which is provided with eccentric variable speed sectors and concentric constant speed sectors as is shown in FIGURE 4 of the drawings.

A cam roller 26, which is preferably of a roller or ball bearing structure engages in cam track 25. The cam roller 26 is attached to the shaft with the provision of a set screw 27 and link 28. Movement of the roller in track 25 causes movement of the cam and rack connected thereto by threaded means 29. Rack 30 in its course of movement on rack support 31 meshes with pinions 32 carried by shafts 33 which are connected to the variable resistance means 11 three of which are shown in the drawings.

While three variable resistance means are shown in the drawings for regulating the excitation to three respective speed regulating means and thusly control the speed of three different pumps, it is to be understood that any number of such variable resistance means, within the limits of reasonable mess, may be employed in connection with the flow control means 9 depending on the number of pumps or pumping units employed in the station including the flow control.

In addition to the above variable resistance means 11 which act to vary the excitation to the magnetic coupling 6, means are embodied in the control for starting or stopping the respective pumps associated therewith.

Figure 5:
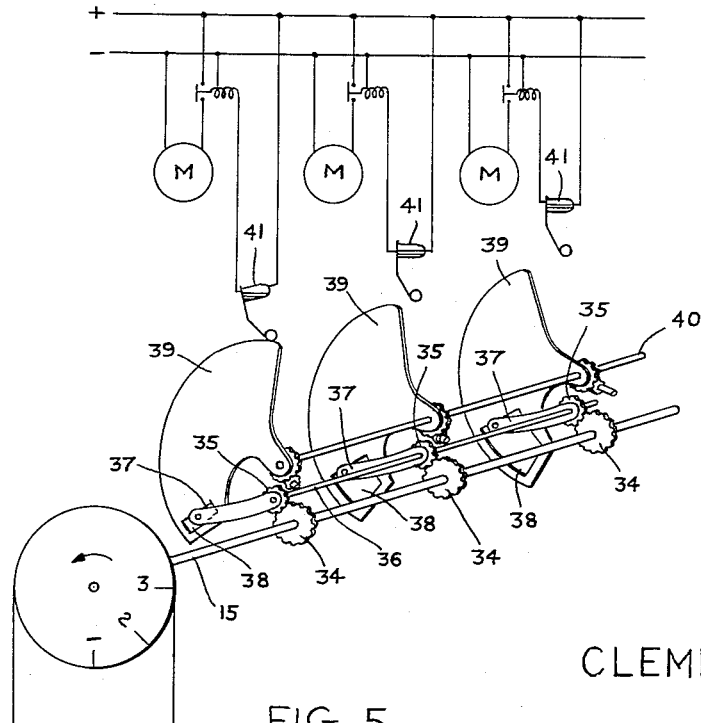
FIGURE 5 is a fragmentary view partly in section and partly in elevation of the cams and switches associated with the station control for controlling the operation of a pump or pumps.

The arrangement, disposition and operation of such a starting and stopping mechanism is shown in FIGURE 5 of the drawings and described in detail in Worthington Corporation's United States Letters Patent 2,922,372. Thusly, shaft 15 is provided with a plurality of step-down gears 34 adapted to mesh with pinions 35 fixed on a shaft 36 extending parallel to shaft 15. Each pinion is provided with an arcuate arm 37 connected thereto. The other end of arm 37 is provided with a pin which is disposed in a slot 38 of a circular like cam 39 and moves in the slot to activate the cam. The cams 39 are carried on a shaft 40 extending parallel to shaft 36 and are disposed to contact mercury switches 41 at different intervals. Initial contact of the mercury switch 41 acts to close the circuit of pump motor 7 and start same. The mercury switch when closed permits the circuit of a motor to be energized through a solenoid switch connected therein.

As was hereinbefore stated and in order to lower the reference level in the suction reservoir 3, means taking the form of a controller 101, shown generally in FIGURE 1 and schematically in FIGURE 2, is disposed to sense level in the conduit 100 and transmit an increase in level to the electric controller 8 to thereby start pumps which in effect will lower the reference level.

More particularly controller 101 includes an indicator means 102 which is similar to the indicator means 12 of the station flow control. The indicator means is shown as comprising a sprocket wheel 103 keyed to a shaft 104 and including means for imparting rotation thereto such as a chain 105 as is clearly shown in FIGURE 1 of the drawings. The chain 105 has a counterweight 106 attached to one end thereof and the other end is connected by any well known manner to a float 107 which is located in float tube 108. The bottom of or open lower end of the float tube extends into the outlying conduit 100 at about the normal level of liquid therein so that variances in the level of liquid in the conduit will move the float 107. Movement of the float under variances of the liquid level will through sprocket chain 105 rotate the sprocket 103 and shaft 104.

A potentiometer 109 is connected to shaft 104 to sense the variances in the level in the outlying conduit 100 and connected to potentiometer 111 which can be calibrated by adjusting resistors 112.

Rectifier 115 and transformer 116 and condensers 117 are included between the potentiometers to provide proper D.C. power to the balanced relay 110 as line current is usually alternating due to practical considerations.

Relays 124' and 125' are included in the circuit and actuated respectively by contacts 120 and 120'. The relays 124' and 125' close circuits to motor 114 through time delay relays 124 and 125 which close contacts R-1 or R-2 depending on the position of the armature in balanced relay 110. Contacts 126 and 127 of relays 124' and 125' being closed also upon actuation of either of said relays.

A circuit is completed and motor 114 drives shaft 118 which includes cams 119 mounted thereon.

Motor 114 drives shaft 118 which includes cams 119 mounted thereon. The cams are set so as to contact mercury switches 121 disposed in lines connected to the respective pump motor 5 to actuate them into operation as will be discussed in detail hereinafter.

It will be evident that the arrangement described hereinabove is operative to provide a system wherein the reference level at the station may be lowered to provide a greater flow gradient to the suction reservoir.

However, in practice it has been found practical to provide means to start the pump at minimum speed and as will be pointed out in detail include delaying means which delay the speed-up of the operating unit or units for an interval that coincides with the time needed for the water or like to flow from the outlying conduit 100 to the suction reservoir 3. This is accomplished by providing a second reversing motor 122 which is connected to the winding drum 21 through a reduction gear or the like 123.

This delay is accomplished as follows: The relays 124' and 125' actuated respectively by contacts 120 and 120' close circuits through time delay relays 124 or 125 depending on position of armature in relay 110. Contacts 128 or 129 or 136 or 137 of the time delay relays are closed. Depending on the movement of the cam 13 at the station control shaft 15 will move cam 1 or cam 2 to close either contacts 136 or 137 and seal the circuit by closing contacts 145 or 141 and energizing relays 138 or 139. Accordingly since contacts 132, 134, 133 and 135 are normally closed the circuit to the motor 122 will be completed to thusly operate the station control to speed up the operating pump to maximum output or to reduce the pump speed.

It is necessary to seal the circuit including relays 138 or 139 so that opening of the energizing contact A on cam 1 or B on cam 2 will not stop the motor 122 until contact B of cam 1 or contact A of cam 2 opens the circuit.

This is accomplished by providing normally closed switches 132, 133, 134 and 135 on cams 1 and 2; switches 136 and 137 respectively closed upon operation of either relay 124 or 125 and relays 138, 139 operate when contacts 136 or 137 are closed. When relays 138 or 139 operate, their sealing contacts 141 or 145 close to keep relay energized.

*Operation*

Potentiometer 109 when actuated by indicator means 102 will cause a change in its resistance and accordingly it will be out of balance with the resistance of potentiometer 111. The unbalance will cause relay 110 to close either contacts 120 or 120' which in turn will start time delay relays 124 or 125. The circuit to the rotor 114 will be closed and thusly motor 114 will rotate until the first of cams 119 closes to start the first pump at minimum speed. After a predetermined time, time delay relays 124 or 125 will close and their contacts 128 or 129 and 136 or 137 will be energized. Due to the association of cams 1 and 2 with the station flow control 9, cam 1 will rotate in view of the usual transmission of lever variations from suction reservoir 3 by float 22. As a consequence relays 138 or 139 will be operated and contacts 130 or 131, 141 or 145 will close and complete the circuit through the re-positioning means or motor 122. The motor through gear box 123 and winding drum 21 and cable 19 will move to adjust the operating pump to maximum speed until contact B of cam 1 opens to open normally closed switch 134.

In order to accomplish re-positioning of the cam 13 to adjust pump speed it will be evident that winding drum 21 must be provided with means permitting free movement of the float connected thereto during above re-positioning operation.

This may be accomplished by including a magnetic clutch 21' and a suitable control system readily purchasable on the open market or arranging a motor, gear box, and drum arrangement that rides on cable 19 with suitable guides as will be easily understood in the art.

Increasing the speed of the pump will in effect cause a lowering of the wet well level and thus eliminate the arresting tendency that a high level has on the flow from outlying conduit 100.

When the upstream liquid level rises further, eventually the cam operated motor 114 will close the contact or switch 121 associated with the second cam starting the second pump in similar fashion as was indicated above in connection with a single pump.

Re-positioning also is accomplished as was described in connection with the first pump and additional pumps may be similarly started into operation.

As was the case with controls shown in the above mentioned prior patents of the assignee the starting or speed changes of the pumps may be arranged to become effective at various liquid levels in the reservoir 3 and conduit 100 or at different degrees of variance in the liquid level. All such changes or settings of the apparatus are possible through the manipulation of the potentiometers, switches, control means, and the various other setting adjustments provided for as hereinbefore described.

Although this invention has been described with reference to specific apparatus, it will be appreciated that a wide variety of changes may be made within the ability of one skilled in the art without departing from the scope of this invention. For example, some of the components of the apparatus may be reversed, certain features of the invention may be used independently of others, and equivalents may be substituted for the apparatus, all within the spirit and scope of the invention as defined in the appended claims.

What is claimed is:

1. The combination of a variable flow control means for use with a pumping station having a suction reservoir, said pumping station including a pump having a suction inlet connected to the suction reservoir, driving means for said pump and a magnetic coupling operatively interconnecting said pump to said driving means for varying the power flow from said driving means to said pump; said variable flow control means including a potentiometer connected to the magnetic coupling, shaft means journaled in said variable flow control means, a cam fixedly mounted on said shaft and said cam connected to the potentiometer for changing the setting thereof according to the level in said suction reservoir, said variable flow control means including indicator means comprising a float disposed in the suction reservoir and movable with the level therof, a sheave fixedly connected to said shaft, a cable mounted about said sheave and connected to said float to transmit level changes to said sheave, shaft and cam; and a winding drum connected to said cable and between said sheave and float for resetting the position of said cam at predetermined periods of operation; with a controller located at a point remote from said pumping station, a first potentiometer for said controller, a float to sense wet well level at said point remote from the pumping station and said float connected to the first potentiometer to vary the amount of excitation passing therethrough, a balancing potentiometer connected to said first potentiometer at one end and to a motor operated switching means at the other end to start said motor operated switching means on unbalancing of resistance between said first and balancing potentiometers, a reversing motor means connnected to said winding drum to drive said winding drum to reset the cam to vary the pump output, means connecting said reversing motor to a source of power, and said last mentioned means including a time delay relay operative to delay the action of said reversing motor on said winding drum.

2. The combination of a variable flow control means for use with a pumping station including a suction reservoir, said pumping station including a plurality of pumps having their suction inlets connected to the suction reservoir, a constant speed driving means for each of said pumps and speed regulating means connecting the constant speed driving means to its corresponding pump; said variable flow control means including a plurality of potentiometers each connected to one of the speed regulating means, shaft means journaled in said variable flow control means, a cam fixedly mounted on said shaft and said cam connected to the potentiometers for changing the settings thereof according to the level in said suction reservoir, said variable flow control means including indicator means comprising a float disposed in the suction reservoir and movable with the level thereof, a sheave fixedly connnected to said shaft, a cable mounted about said sheave and connected to said float to transmit level changes to said sheave, shaft and cam; and a winding drum connected to said cable between said sheave and float for resetting the position of said cam at predetermined periods of operation; with a controller located at a point remote from said pumping station, a first potentiometer for said controller, a float to sense wet well level at said point remote from the pumping station and said float connected to the first potentiometer to vary the amount of excitation passing therethrough, a balancing potentiometer connected to said first potentiometer at one end and to a motor operated switching means at the other end to start said motor operated switching means on unbalancing of resistances between said first and balancing potentiometers, a reversing motor means connected to said winding drum to reset the cam to vary the output of said pumps, means connecting said reversing motor to a source of power, and said last mentioned means including a time delay relay operative to delay the action of said reversing motor on said winding drum.

3. The combination of a variable flow control means for use with a pumping station including a suction reservoir, said pumping station including a pump, driving means for said pump and speed regulating means operatively interconnecting said pump to said driving means for varying the power flow from said driving means to said pump; said variable flow control means including indicator means for measuring the level in said suction reservoir, said variable flow control means including control means operatively interconnecting said indicator means to said speed regulating means to vary the pump output when the level in said reservoir varies from a preselected level; with a controller including means to indicate the level at a point remote from said pumping station, a first variable resistance means for said controller and connected to the means to indicate level, a balancing variable resistance means connected to said first variable resistance means at one end and to said variable flow control means at the other end to cause said control means to regulate the pump speed on unbalancing of resistance between said first and balancing variable resistance means.

4. The variable flow control claimed in claim 3 including a delaying means interconnecting said balancing potentiometer to said control means to cause a delay in the action of said control means in regulating the pump speed.

5. The combination of variable flow control means for use with a pumping station including a suction reservoir, said pumping station including a pump having a suction inlet connected to the suction reservoir, driving means for said pump and speed regulating means operatively interconnecting said pump to said driving means for varying the power flow from said driving means to said pump; said variable flow control means including variable resistance means connected to the speed regulating means, said variable flow control means including means for changing the setting of the variable resistance means according to the level in said suction reservoir, said last mentioned means comprising a cam operatively connected to the variable resistance means, indicator means connected to said cam to move the cam according to changes in level in the suction reservoir, and adjustable means connected to the indicator means to reset the cam during predetermined periods of operation; with a controller including indicator means to sense the level at a point remote from said pumping station, a first variable resistance means for said controller connected to said means to sense the level, a balancing variable resistance means interconnecting said first variable resistance means to said variable flow control means to cause said variable flow control means to regulate the pump speed on unbalancing of resistance between said first and balancing variable resistance means.

6. The variable flow control claimed in claim 5 including a delaying means interconnecting said balancing potentiometer to said control means to cause a delay in the action of said control means in regulating the pump speed.

7. The combination of a variable flow control means for use with a pumping station including a suction reservoir, said pumping station including a pump having a suction inlet connected to the suction reservoir, driving means for said pump and a magnetic coupling operatively interconnecting said pump to said driving means for varying the power flow from said driving means to said pump; said variable flow control means including a potentiometer connected to the magnetic coupling, shaft means journaled in said variable flow control means, a cam fixedly mounted on said shaft and said cam connected to the potentiometer for changing the setting thereof according to the level in said suction reservoir, said variable flow control means including indicator means comprising a float disposed on the suction reservoir and movable with the level thereof, a sheave fixedly connected to said shaft, a cable mounted about said sheave and connected to said float to transmit level changes to said sheave, shaft and cam; and a winding drum connected to said cable and between said sheave and float for resetting the position of said cam at predetermined periods of operation; with a controller including indicator means to sense the level at a point remote from said pumping station, a first potentiometer for said controller and connected to said indicating means of said controller, a balancing potentiometer connected to said first potentiometer at one end and to a motor operated switching means at the other end to start said motor operated switching means on unbalancing of resistance between said first and balancing potentiometers, a reversing motor means connected to said winding drum to drive said winding drum to reset the cam to vary the pump output and means connecting said reversing motor to a source of power.

8. The combination of a variable flow control for use with a pumping station including a suction reservoir, said pumping station including a plurality of pumps having their suction inlets connected to the suction reservoir, a constant speed driving means for each of said pumps and speed regulating means connecting the constant speed driving means to its corresponding pump; said variable flow control means including indicator means for measuring the level in said suction reservoir, said variable flow control means including control means operatively interconnecting said indicator means to each of the speed regulating means to selectively vary the output of said pumps when the level in said reservoir varies from a preselected level; with a controller including means to indicate the level at a point remote from said pumping station, a first variable resistance means for said controller and connected to the means to indicate level, a balancing variable resistance means connected to said first variable resistance means at one end and said variable flow control means at the other end to cause said control means to regulate the speed of said pumps on unbalancing of resistance between said first and balancing variable resistances.

9. The variable flow control claimed in claim 8 including a delaying means interconnecting said balancing potentiometer to said control means to cause a delay in the action of said control means in regulating the pump speed.

10. The combination of a variable flow control means for use with a pumping station including a suction reservoir, said pumping station including a plurality of pumps having their suction inlets connected to the suction reservoir, a constant speed driving means for each of said pumps and speed regulating means connecting the constant speed driving means to its corresponding pump; said variable flow control means including a plurality of potentiometers each connected to one of the speed regulating means, a cam connected to the potentiometers for changing the settings thereof according to the level in said suction reservoir, said variable flow control means including indicator means comprising a float disposed in the suction reservoir and movable with the level thereof, means connecting the float to the cam to transmit changes in reservoir level to said cam, and a winding drum connected to said last mentioned means for resetting the position of the cam at predetermined periods of operation; with a controller including indicator means to sense the level at a point remote from said pumping station, a first potentiometer for said controller and connected to said indicator means, a balancing potentiometer connected to said first potentiometer at one end and to a motor operated switching means at the other end to start said motor operated switching means on unbalancing of resistance between said first and balancing potentiometers, a reversing motor means connected to said winding drum to drive said winding drum to reset the cam to vary the pump output, and means connecting said reversing motor to a source of power.

References Cited in the file of this patent
UNITED STATES PATENTS

| | | |
|---|---|---|
| 2,733,660 | Towle et al. | Feb. 7, 1956 |
| 2,791,179 | Dorer | May 7, 1957 |
| 2,922,372 | Dorer | Jan. 26, 1960 |
| 2,950,682 | Kimmel | Aug. 30, 1960 |
| 2,950,683 | Leopold | Aug. 30, 1960 |